United States Patent [19]

Orain

[11] Patent Number: 4,828,534
[45] Date of Patent: May 9, 1989

[54] TRANSMISSION JOINT INCLUDING A DAMPING OF LOAD REVERSALS IN PARTICULAR FOR VEHICLES

[75] Inventor: Michel Orain, Conflans Sainte Honorine, France

[73] Assignee: Glaenzer Spicer, Poissy, France

[21] Appl. No.: 134,296

[22] Filed: Dec. 15, 1987

[30] Foreign Application Priority Data

Dec. 16, 1986 [FR] France ................................ 86 17550

[51] Int. Cl.⁴ .............................................. F16D 3/20
[52] U.S. Cl. .................................. 464/111; 464/167; 464/905
[58] Field of Search ............... 464/111, 120, 122, 132, 464/162, 167, 905

[56] References Cited

U.S. PATENT DOCUMENTS

| | | | |
|---|---|---|---|
| 1,201,791 | 10/1916 | Anderson . | |
| 3,029,617 | 4/1962 | Marquis et al. . | |
| 3,381,497 | 5/1968 | Allen | 464/122 |
| 3,613,396 | 10/1971 | Drevard et al. | 464/111 |
| 3,748,869 | 7/1973 | Orain | 464/132 |
| 3,757,534 | 9/1973 | Orain | 464/111 |
| 4,490,126 | 12/1984 | Orain | 464/111 |
| 4,580,995 | 4/1986 | Orain | 464/111 |

FOREIGN PATENT DOCUMENTS

| | | |
|---|---|---|
| 7143606 | 2/1972 | Fed. Rep. of Germany . |
| 2604995 | 8/1977 | Fed. Rep. of Germany . |
| 2952029 | 7/1981 | Fed. Rep. of Germany . |
| 2476251 | 8/1981 | France . |
| 2580750 | 10/1986 | France . |
| 59-40016 | 3/1984 | Japan ................................ 464/111 |
| 2043204A | 10/1980 | United Kingdom . |
| 2079896 | 1/1982 | United Kingdom ................ 464/111 |
| 2099549 | 12/1982 | United Kingdom . |
| 2119478A | 11/1983 | United Kingdom . |

Primary Examiner—Daniel P. Stodola
Attorney, Agent, or Firm—Wenderoth, Lind & Ponack

[57] ABSTRACT

A tripod element (18) trasmits by its arms (31) circumferential forces (F) to a female member—or bowl—through cups (20) and rolling needles. On the unloaded side of each arm, a clearance is produced between the arm and the corresponding support surface (24) of the bowl. Springs (16) act on the cups (20, 21) in such manner that this clearance is established between the complementary spherical surfaces of the arm and cup. The reserve of oil which is created therein will act as a shock absorber or damper in the case of reversal of the direction of the torque (C). Use in the elimination of shocks created by the reversal of the load on the joint.

10 Claims, 5 Drawing Sheets

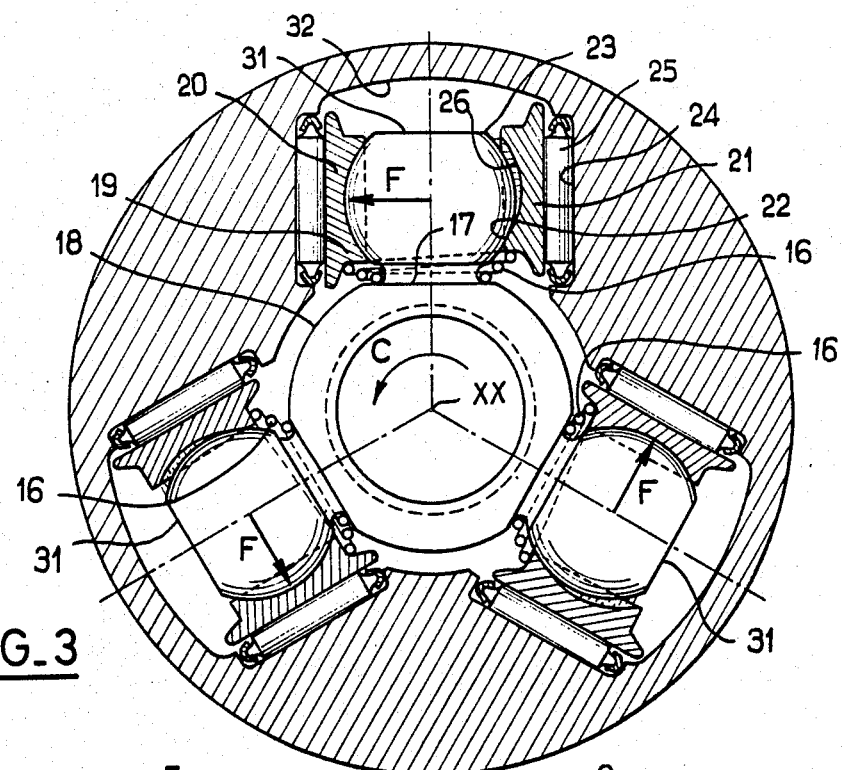
FIG_3
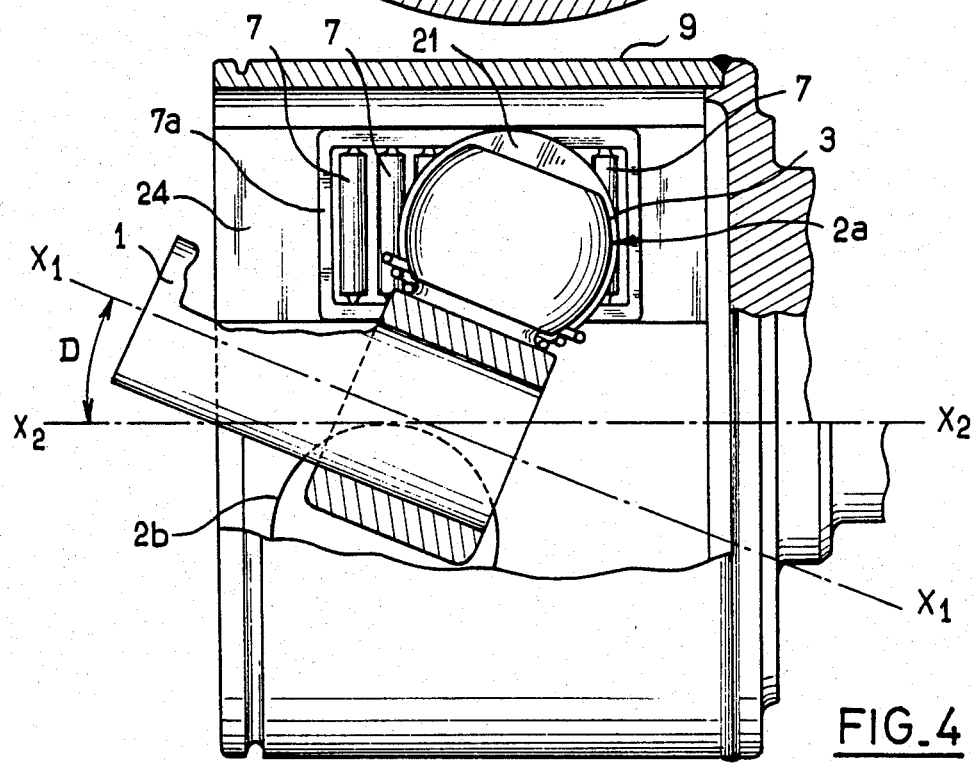
FIG_4

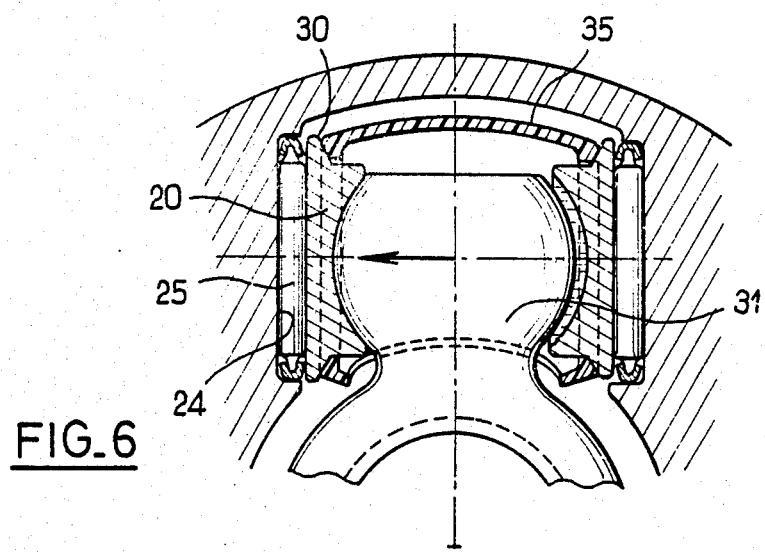
FIG_6
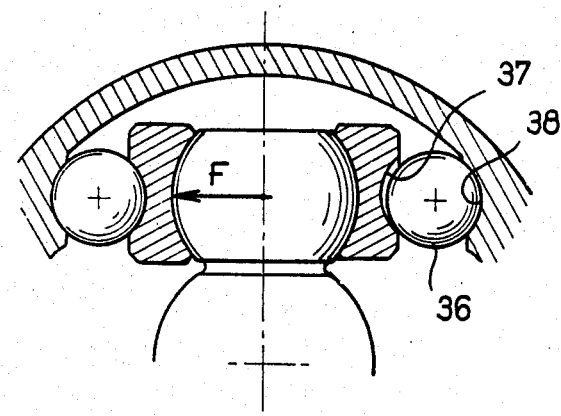
FIG_7
PRIOR ART
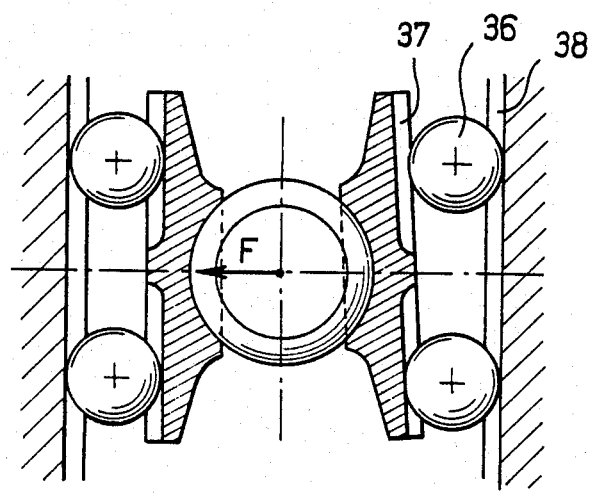
FIG_8
PRIOR ART

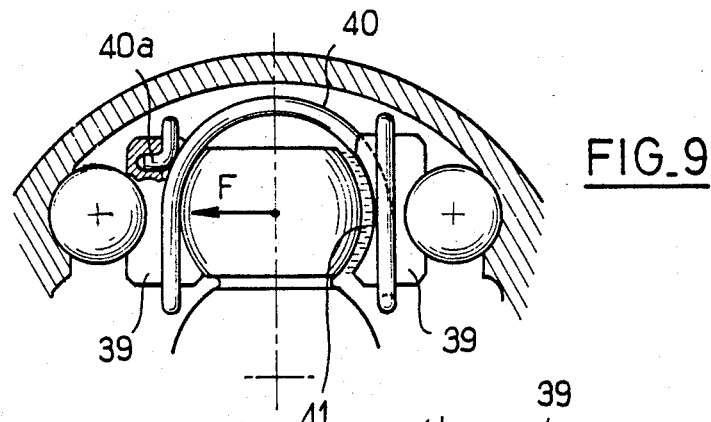
FIG_9
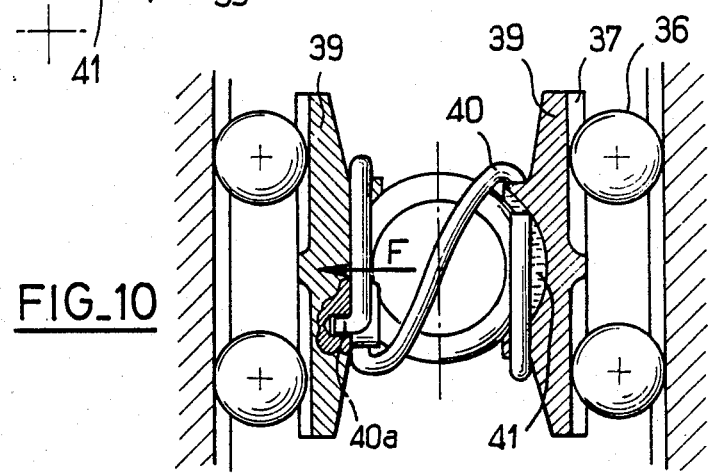
FIG_10
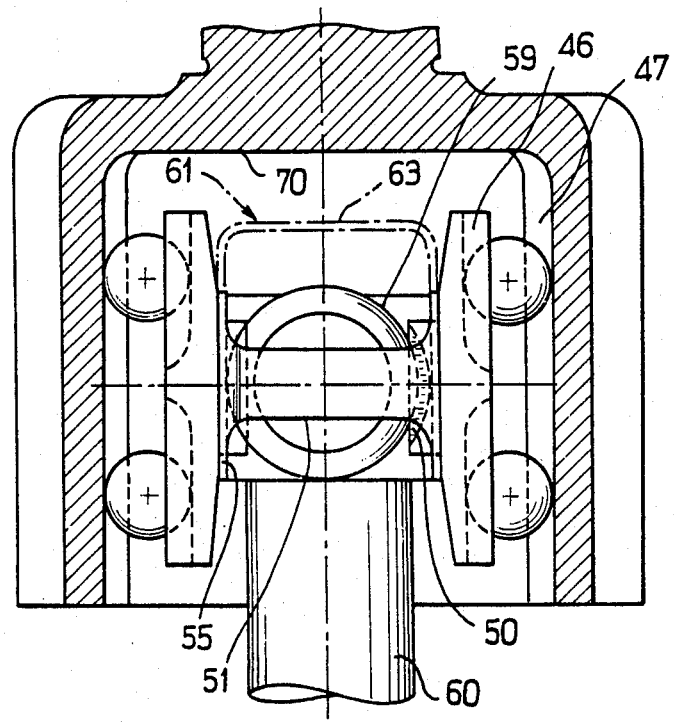
FIG_11

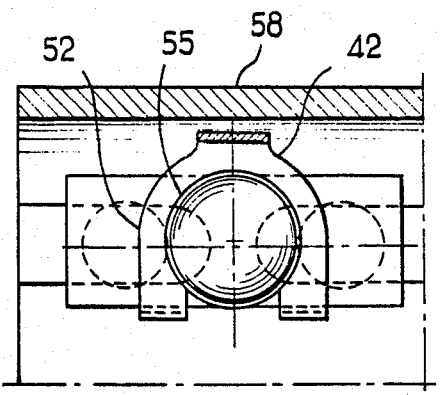
FIG_12
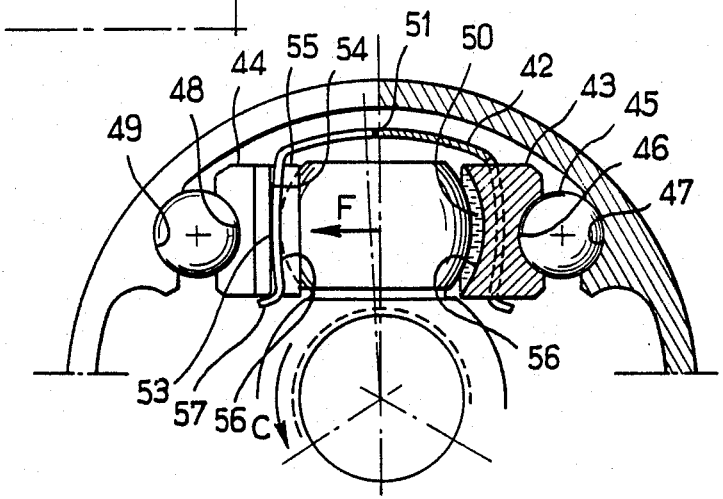
FIG_13
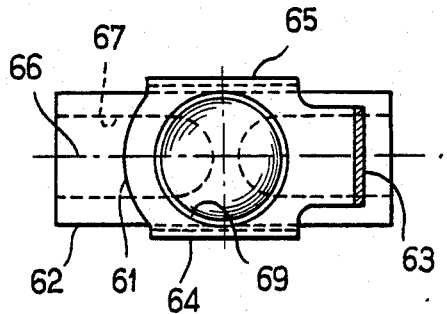
FIG_14
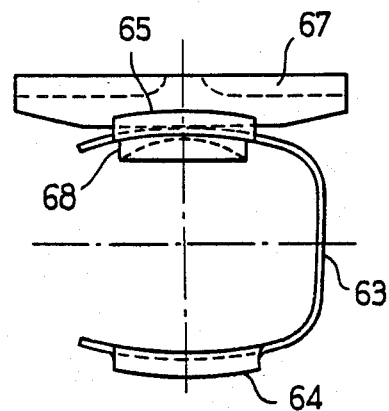
FIG_15

TRANSMISSION JOINT INCLUDING A DAMPING OF LOAD REVERSALS IN PARTICULAR FOR VEHICLES

The present invention relates to a transmission joint, in particular for transmitting power to the wheels of automobile vehicles, comprising a first element provided with radial arms, each of which is disposed between two respective support regions of a second element with interposition between each support region of the second element and the associated arm of the first element, of a transfer element mounted to at least indirectly roll on one of the elements while there is between the transfer element and the other element a contact between substantially rigid complementary surfaces which in operation are in mutual sliding contact of the oscillating type.

Such joints are known from the patents FR-A-2 506 872 and 2 580 751. The invention is also applicable to articulations which comprise connections formed, on one hand, from one or more members rolling along a track and, on the other hand, a planar, cylindrical or spherical surface which slides on a surface of complementary shape which is in confronting relation thereto and with which it marries up perfectly when it bears thereagainst. The first example of application is the joint disclosed in the patent FR-A-2506872.

The object of the present invention is to radically eliminate the noises, percussions and vibrations which might result from the sudden taking up of the clearances existing in such joints, this sudden taking up occurring in particular upon the inversion of the torque transmitted by the joint.

In the joint according to the invention, elastically yieldable means bias each transfer element in a direction tending to spread apart the complementary surfaces by which there is a sliding contact therebetween and said other element.

It has indeed been found, according to the invention that, when operating under load, the clearance appearing on the unloaded side of each arm was established, in the known joints of the type indicated at the beginning, systematically between the transfer element and the member relative to which it rolls, not between the complementary surfaces undergoing an oscillating sliding. Indeed, the film of lubricant existing between said complementary surfaces stuck to the transfer element on the complementary surface carried, according to the embodiments, by the first or second member.

Owing to the elastically yieldable means according to the invention, the two transfer elements associated with each arm are permanently urged back toward the member relative to which they roll, so that, on the unloaded side of each arm, the clearance is established between the complementary surfaces.

Under these conditions, when the clearance is taken up upon an inversion of the load, the shock is damped by the lubricant between the complementary surfaces in a manner which may be explained as follows:

The volume of lubricant between the exactly complementary surfaces is progressively enclosed between these surfaces as they approach each other, and the lubricant reacts by its inertia, its viscosity and its adherence to the spherical walls or by the wetting of the latter. The pressure it exerts against the walls increases substantially as the inverse of the distance between these walls and may consequently assume a very high value. There is thus obtained such a powerful and increasing damping that the speed of approach of the two confronting surfaces progressively drops to zero without an intervention of a metallic contact, the film of lubricant being in any case preserved.

The potential percussion energy is therefore absorbed or damped in viscous and inertial pressure drops in the lubricant which are translated into an imperceptible rise in temperature. These effects are rendered possible by the fact that the complementary surfaces are substantially rigid and very precisely matched to each other owing to their relative oscillating, tacking or FIG. 8 sliding movement.

There is consequently observed the disappearance of any perceptible shock or vibration upon the reversals of the direction of the torque. On the other hand, according to the prior art, the taking up of clearance occurred between mutually rolling surfaces, i.e. surfaces having very small areas of contact and under very high pressures, which explains why the lubricant was unable to damp or absorb the shock.

Further features and advantages of the invention will be apparent from the following description.

In the accompanying drawings, given by way of non-limitative examples:

FIG. 3 is a view similar to FIG. 1, but complete, and concerning a joint according to the invention;

FIG. 4 is a view of the joint of FIG. 3 in partial axial section, at an angle, only one transfer element and the associated rolling track being shown;

FIG. 6 is a view similar to FIG. 3, but concerning a third embodiment of the invention;

FIGS. 7 and 8 are views similar to FIGS. 1 and 2 respectively, but concerning another type of known joint;

FIGS. 9 and 10 are views similar to FIGS. 7 and 8 respectively, but concerning another embodiment of the invention;

FIG. 11 is a plan view, with an axial section of the bowl, of a fifth embodiment of the invention;

FIG. 12 is a view of the joint of FIG. 11 in axial semi-section, the tripod having been removed;

FIG. 13 is a semi-end elevational view, with a part in section, of the joint of FIGS. 11 and 12;

FIG. 14 is a view similar to FIG. 12, but concerning a variant, and

FIG. 15 is a top plan view of the elastically yieldable staple of the joint of FIG. 14 associated with one of the transfer elements.

Figure 1:
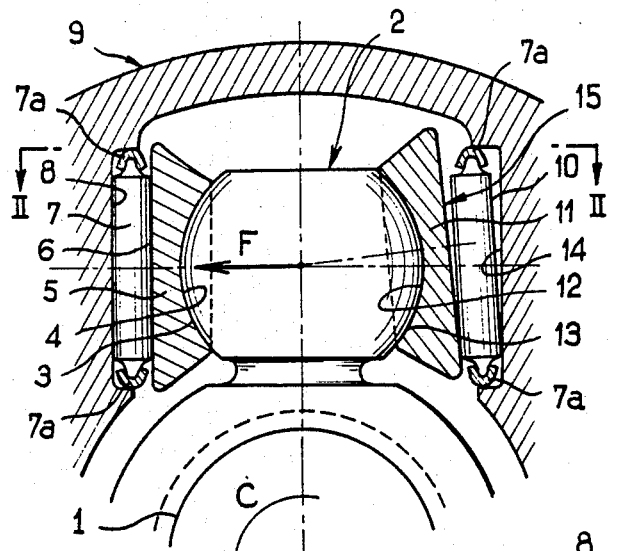
FIG. 1 is a partial sectional view perpendicular to the axis of a known joint.
Figure 2:
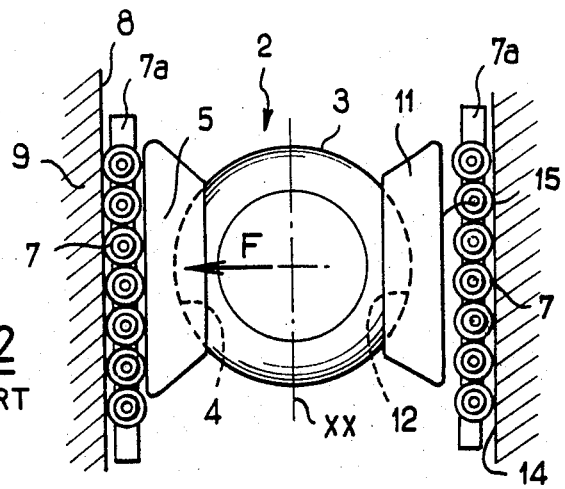
FIG. 2 is a sectional view taken on line II—II of FIG. 1.

The known transmission joint shown in FIGS. 1 and 2 comprises a first member—or tripod—including a ring having an axis X—X from which radially outwardly extend three radial arms 2, only one of which is seen in FIGS. 1 and 2, these arms being evenly angularly spaced apart about the axis X—X. The lateral wall of each arm 2 is formed by a convex spherical region 3 whose centre is located at a distance from the axis X—X and inside the arm. This tripod is fitted on and secured to the driving shaft 1 which also has the axis X—X.

Each arm 2 of the tripod is located between two transfer elements 5, 11—or cups—whose radially inner spherical surface (relative to the axis of the arm) 4, 12 is concave and in ball joint contact with the spherical region 3 of the arm. The radii of curvature of the spherical regions of the arm and of the spherical surfaces of the cups are equal.

The cups 5, 11 moreover include a radially outer planar surface 8 (relative to the axis of the arm) by which they are each in rolling relation to the respective one of six rolling tracks 8, 14 provided inside a second member—or bowl—9, the fixing of which to the second shaft of the joint has not been shown.

The rolling tracks 8, 14 are planar and extend in a direction parallel, on one hand to the axis of the associated arm 2 and, on the other hand, to the axis of the bowl 9 and of the second shaft of the joint, which axis is the axis X—X of FIG. 1 when the joint is in its coaxial position.

The rolling relation between each transfer element 5, 11 and the asociated rolling track 8, 14 is ensured by the interposition of cylindrical needles 7 whose conical ends are retained in a cage 7a.

In operation, the shaft 1 transmits a torque represented by the arrow C which produces on each trunnion 2 a transfer force F and therefore maintains the convex sphere 3 of the trunnion in bearing relation to the concave sphere 4, having an exactly identical radius, of the cup 5. This cup 5 transfers this force by its planar surface 6 to the series of needles 7.

When the joint operates at an angle, the axis X—X is inclined relative to the axis of the bowl 9. The cups 5, 11 on one hand swivel relative to the trunnion 3 by the ball joint sliding thereof in the substantially rigid complementary pairs of surfaces 3, 4; 12, 13 and, on the other hand, oscillate in a to-and-fro manner along the bowl 9 by a rolling action owing to the rows of needles 7.

The sliding of the cup on the spherical trunnion completes the spherical bearing or support during the running in of the joint and the sphericity of the two parts rapidly assumes optical quality from both the geometrical point of view and the surface quality point of view. It should indeed be noted that in operation, each point of one of the surfaces of each pair of complementary surfaces, instead of describing the same path relative to the other surface, on the contrary, passes, in the course of operation and in particular running in, through substantially all the points of at least a part of the other surface. This mode of contact, termed an oscillating tacking mutual sliding, which will again be explained hereinafter with reference to FIG. 4, greatly facilitates the obtainment of the aforementioned surface quality.

There is in this way established a continuous film of lubricant between the concave and convex surfaces, which film is extremely thin but very resistant to pressure and which results in a very low resistance to sliding and a low temperature and a high operating efficiency.

In FIGS. 1 and 2 the clearances have been intentionally exaggerated for reasons of clarity: the needles 10 are completely unloaded and free between the surfaces 14 and 15 of the cup and the rolling track to the extent of the existing clearance.

Indeed, generally, the cup 11 remains stuck by its concave spherical surface 12 against the convex spherical surface 13 of the trunnion. This may be explained by the presence of the film of lubricant and the perfect bearing of the two spherical surfaces. There is therefore a more or less large clearance or spacing between the needles and at least one of the two planar surfaces 14 and 15.

In the case of sudden reversal of the direction of the torque C, as for example when the accelerator pedal is suddenly released, the force F changes direction and the planar surface 15 of the cup comes to strike, through the series of needles 10, the planar surface 14 of the rolling track thereby producing a noisy shock which can be heard in the driving compartment or even a train of shock waves transmitted torsionally by the shaft in the kinematic linkage between the power unit and the wheels.

The object of the present invention is not only to avoid this noisy percussion in the homokinetic joint itself, but also to absorb or damp the torsional percussion energy of the whole of the kinematic transmission line so that this percussion energy cannot produce shocks when the clearance in the other elements of the connection is taken up and, for example: the second homokinetic joint, the various splined connections, differential gear pinions, etc...

For this purpose, means are provided according to the invention for maintaining the transfer elements in continuous bearing relation to their rolling track and causing to appear the constructional operational clearance solely between the surfaces capable of perfectly marrying up throughout their surface when a force is applied thereto.

In the embodiment shown in FIG. 3, these means comprise for each arm of the tripod, a frustoconical spring 16 which surrounds the arm and bears by one end against the base or ring 17 of the tripod 18 and by the opposite end against a flange of each of the cups 20 and 21 located on each side of this arm while allowing the articulation components complete freedom of movement.

More particularly, there is exploited the fact that the cups 20 and 21 have, in the plane transverse to the axis X—X (the plane of FIG. 3) a profile whose region which is the closest to the axis X—X, is capable of forming a wedge between the arm 2 of the tripod and the associated rolling track. Thus, the springs 16 bias the cups 20 and 21 in a radial direction relative to the axis X—X in the direction causing the forcing of the wedge between the arm and the associated rolling track.

The force F applies the spherical trunnion against the cup 20 which in turn urges the needles against the rolling track. On the other hand, in the upper and right part of FIG. 3, the spring urges the cup 21 vertically, wedging it between the spherical surface 23 on which it bears by its corner 22, and the series of needles 25 bearing against the rolling track 24. The elastically yieldable means for applying the cups against the needles and the rolling tracks exert sufficient force to overcome the sticking of the spherical surfaces coated with lubricatnt. If necessary, lubrication grooves on one of the two spherical surfaces coated with lubricant by reducing the effect of adherence, will enable the spring to ensure the permanent bearing of the cups against the rolling tracks, even in the case of a rapid reversal of the direction of the torque C. It is ensured that there is a bearing against the rolling track and a mutual unsticking of the complementary surfaces 23 and 26, since, under the effect of the thrust exerted by the spring 19, the transfer element or cup 21 pivots about its point of contact with the lower edge of the needles 25, i.e. their edge which is the closest to the axis X—X.

The constructional or operational clearance of this trunnion of the joint therefore appears completely between the convex spherical surface 23 and the concave spherical surface 26 of the same radius of curvature. This space is therefore completely filled with the lubricant, namely oil or grease, of the homokinetic joint.

When the direction of the torque C is suddenly reversed, the force F tends to apply the spherical surface 23 of the trunnion against the complementary concave surface 26 of the cup 21.

Notwithstanding the high values which may be assumed by the reversed force F, it is found that no noise occurs and that no torsional shock wave or torque peak is transmitted by the joint to the kinematic chain.

This phenomenon may be explained in the manner described hereinbefore.

When the surfaces 23 and 26 will be in bearing relation to each other but separated by the film of lubricant, the spherical surfaces of the cup 20 and the trunnion will be in turn separated by a clearance filled with lubricant;

As shown in FIG. 4, at an angle D between the axis X1-X1 of the tripod and the axis X2—X2 of the bowl 9, the arms 2 of the tripod pass in succession through positions 2a and 2b in particular, which results in a to-and-fro motion thereof in the bowl 9. The cups 21 follow this to-and-fro motion by rolling on the needles 7 which roll along their rolling track 8. At the same time, as this relative motion between the tripod and the bowl is the same as if, with the bowl being fixed, the shaft of the tripod moved conically, the spherical surfaces 3 of the arms 2 swivel in the complementary spherical surfaces of the cups 21.

This produces between the spherical bearing surface of the tripod and the associated cups an oscillating zigzaging sliding, i.e. in respect of which any point of any one of the surfaces is in operation capable of facing any point of at least a certain region of the complementary surface.

Figure 5:
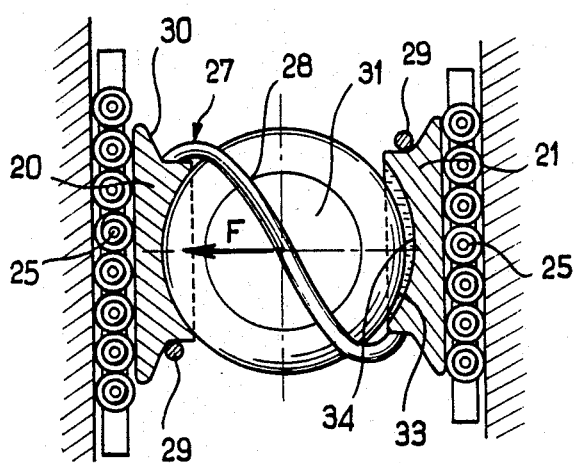
FIG. 5 is a view similar to FIG. 2, but concerning another embodiment of the joint according to the invention.

In the embodiment shown in FIG. 5, which will be described only in respect of its differences relative to FIGS. 1 and 2, the elastically yieldable means for spacing apart the cups is a helical spring 27 comprising an active coil 28 and, at each end, an adjoining coil 29 bearing against the flange 30 of the cups 20 and 21. The active coil 28 advantageously extends around the end of the trunnion by passing between the latter, which may be recessed for this purpose if necessary, and the vault of the barrel, which is similar to the vault 32 shown in section in FIG. 3. Thus this spring allows complete freedom of movement to the mechanism without increasing the overall size.

The principle of damping or absorbing by ejection of the lubricant trapped between the spherical surfaces 33 and 34 is identical to that previously explained.

In the embodiment shown in FIG. 6, the elastically yieldable means are tubular spacer members 35 of elastic elastomer interposed between the confronting cups, the ends of which bear against the flange 30 of the cups. A lateral opening receives the trunnion 31 with sufficient clearance to permit its free movement during the operation of the joint at an angle. The tubular spacer members have a barrel shape in axial section.

FIGS. 7 and 8 show a joint known from the document FR-A-2 580 751 which differs from the joint according to FIGS. 1 and 2 in that each row of needles is replaced by two balls 36 which roll on one hand in an individual channel 37 on the transfer element and, on the other hand, in a rolling track 38, common to the two balls of the bowl.

In such a known joint, a clearance appears between the balls 36 and the rolling track 37 under the effect of the torque. When the torque changes direction, F also changes direction and a percussion and a noise occur resulting from the sudden contact of the ball 36 against the rolling track 37 or the rolling track 38.

In the embodiment of the joint according to the invention shown in FIGS. 9 and 10 which employs the basic structure shown in FIGS. 7 and 8, each arm of the tripod element is provided with a helical compression spring 40 whose two opposed ends each bear against one of the transfer elements—or shoe—39, while an active part, forming about one coil, surrounds the free end of the arm. At least one of the ends of each spring 40 is angularly indexed relative to the associated shoe 39. In the embodiment, at this end of the spring, a bent end portion 40a of the spring wire 40 is engaged in a blind aperture in the shoe 39. This indexing ensures that the spring 40 cannot assume by rotation about its axis a position in which its active coil would bear against the arm of the tripod element.

The spring 40 forcefully urges the shoes 39 apart so that the lubricant fills the space 44 between the unloaded complementary spherical surfaces. When the torque changes direction, the lubricant interposed at 41 is expelled in resisting by its viscosity, its inertia and its adherence to the walls and thus opposes a large and increasing pressure to the spherical surfaces which move toward each other more and more slowly. At the end of this movement, a film of lubricant remains between these confronting concave and convex spherical surfaces which have perfect conformity, so that the potential energy of percussion is completely absorbed and thus any possibility of noise and shock wave is radically eliminated.

The embodiment shown in FIGS. 11 to 13 also uses the basic structure according to FIGS. 7 and 8. An elastically yieldable staple, or yoke, 42 comprises a central portion or arch 51 located beyond the free end of the associated arm of the tripod element and operating under bending stress, and four tabs 52 which come to exert a thrust by their outwardly convex curved surface 53 against bearing planes 54 defined by the shoes 43 and 44 of the side opposed to the associated rolling track 47, 49 on each side of a circular projection 55 in which is formed the concave spherical surface 56 adapted to swivel as a ball joint on the complementary spherical surface of the arm of the tripod element. The tabs 52 define therebetween a circular recess which matches the contour of the projection 55 and is consequently centered thereon.

The ends 57 of the tabs of the spring are bent under the shoe, i.e. against the side of the shoe which is the closest to the axis of the bowl so as to maintain the staple at a constant orientation relative to the bowl 58 of the joint during the operation of the latter and thus avoid interferences with the trunnion 59 of the tripod element or with the shaft 60.

The spring 42 of hardened sheet steel moves the shoes 43 and 44 away from each other which thus maintain the balls 45 under a prestress against the rolling tracks 46 and 47. The balls between the rolling tracks 48 and 49 support the load F.

Thus the clearance space 50 between the complementary spherical surfaces on the unloaded side, which clearance is very exaggerated in FIGS. 11 and 12, is filled with lubricant which performs its function of a shock absorber or damper and eliminator of percussion when the direction of the torque C, and therefore the direction of the force F, is reversed.

In the embodiment shown in FIGS. 14 and 15, which will only be described in respect of its differences from the preceding embodiment, the central portion 63 of each staple 61 is located, relative to the associated tripod arm, on the side opposed to the shaft 60, i.e. on the side of the inner end 70 of the bowl. This is shown in dot-dash lines in FIG. 11 as an alternative to the staple shown in full line in this Figure.

This arrangement clears the space at the end of the trunnion and permits the addition of an inner bulge for fixing in the wall of the bowl. The bulge 68 of each shoe extends through a corresponding aperture 69 in the adjacent arm of the fastener 61 so as to position and trap the staple 61. The orientation of the staple 61 about the axis of the projections 68 is ensured by one or two formed-over lateral edge portions 64 and 65 pertaining to each arm of the staple and engaged against the adjacent lateral edge portions of the shoes so as to orient the axis of symmetry of the central portion—or bridge—63 in a direction parallel to the axis 66 of the rolling track 67 of the shoe.

The devices just described ensure noiseless operation in the event of a sudden reversal of the torque, notwithstanding the angular clearance in the joints. It has moreover the following advantages:

Complete reliability and unlimited life.

Low production and assembling costs.

Possibility of establishing the desired prestressing level by adjusting the stiffness of the springs, whether these be of wire or sheet metal, and their initial flexion.

Many other types of springs performing the same function may be proposed without departing from the scope of the present invention.

For example, the springs for spacing apart the transfer elements may be of the hairpin type or Belleville washers.

In the case of the basic structure comprising cups and needles according to FIGS. 1 and 2, the elastically yieldable means according to the invention may be staples in the form of steel bands of the type described with reference to FIGS. 11 to 15.

This invention is also applicable to mechanisms where the sliding surfaces are planar or cylindrical with the use of exactly the same technology.

What is claimed is :

1. A transmission joint, in particular for transmitting power to a wheel of an automobile vehicle, said joint comprising a first member having an axis of rotation and arms radially extending from the first member, a second member having an axis of rotation and two support regions for each radial arm of the first member, a transfer element interposed between each support region and the respective arm which transfer element is at least indirectly rollingly mounted on one of said members, each transfer element having a substantially rigid surface and the other of said members having substantially rigid surfaces which are each complementary to said substantially rigid surface of a respective transfer element, said substantially rigid complementary surfaces being, in operation of said joint, in mutual sliding contact of an oscillating type, and elastically yieldable means associated with each transfer element for biasing the respective transfer element in a direction tending to move apart said complementary surfaces.

2. A transmission joint according to claim 1, in which said contact by complementary surfaces is between said transfer elements and the respective arms, the elastically yieldable means biasing said transfer elements away from each other.

3. A transmission joint according to claim 2, wherein said arms each have free ends and said elastically yieldable means comprise for each arm a spring of a helical type interposed between the two transfer elements associated with each arm and having substantially one single active coil extending around the free end of the respective arm.

4. A transmission joint according to claim 2, wherein said elastically yieldable means comprise for each arm an axially elastically yieldable tube having ends each of which ends bears against a respective one of the two transfer elements and which tube defines a lateral opening receiving the respective arm.

5. A transmission joint according to claim 2, wherein each of the transfer elements has, in a plane transverse to said axis of said member, profile having at least a portion which is capable of forming a wedge between the respective arm and the respective support region, the elastically yieldable means biasing the transfer elements apart from each other by exerting a radially oriented load in a direction for jamming the wedge between the respective arm and the respective support region.

6. A transmission joint according to claim 2, wherein said elastically yieldable means comprise for each arm a staple having arms and a centre region which extends around the respective arm, each arm of the staple bearing against a respective one of the two transfer elements.

7. A transmission joint according to claim 6, wherein each of said arms of the staple carries a shaped portion cooperative with the respective transfer element and angularly indexing the staple relative to the respective transfer element.

8. A transmission joint according to claim 6, wherein said arms have free ends and said centre region of the staple is located radially beyond said free end of the respective arm.

9. A transmission joint according to claim 8, wherein the elastically yieldable means are mounted around each arm and have an end portion which is in bearing relation to the first member and an opposite end portion which is in bearing relation to the two transfer elements on each side of the arm.

10. A transmission joint according to claim 6, wherein a shaft is connected to said first member, and the centre region of the staple extends around the respective arm on a side of the respective arm opposed to said shaft.

* * * * *